US012380255B2

(12) United States Patent
Werner et al.

(10) Patent No.: US 12,380,255 B2
(45) Date of Patent: Aug. 5, 2025

(54) DEVICE SECURITY FOR CABLE THREAT ACTORS

(71) Applicant: INTERNATIONAL BUSINESS MACHINES CORPORATION, Armonk, NY (US)

(72) Inventors: John S. Werner, Fishkill, NY (US); Abigail E. Wise, Wappingers Falls, NY (US); Kyle Olson, Lagrangeville, NY (US); Steven Leslie Shafer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 18/060,131

(22) Filed: Nov. 30, 2022

(65) Prior Publication Data

US 2024/0176917 A1 May 30, 2024

(51) Int. Cl.
G06F 21/00 (2013.01)
G06F 11/07 (2006.01)
G06F 21/55 (2013.01)
G06F 21/85 (2013.01)

(52) U.S. Cl.
CPC ............ *G06F 21/85* (2013.01); *G06F 11/079* (2013.01); *G06F 21/554* (2013.01)

(58) Field of Classification Search
CPC ....... G06F 21/85; G06F 11/079; G06F 21/554
See application file for complete search history.

(56) References Cited

U.S. PATENT DOCUMENTS

| 4,734,637 A | 3/1988 | Chen |
| 6,967,584 B2 | 11/2005 | Maki |
| 8,190,887 B2 | 5/2012 | Koo |
| 9,846,188 B2 | 12/2017 | Imhof |
| 10,250,619 B1 | 4/2019 | Park |

(Continued)

FOREIGN PATENT DOCUMENTS

| JP | 6738135 B2 | 8/2020 |
| KR | 101553246 B1 | 9/2015 |

OTHER PUBLICATIONS

J.R. Tedeschi. (Dec. 2014) Active Time-Domain Reflectometry for Tamper Indication in Unattended Monitoring Systems for Safeguards. https://www.pnnl.gov/main/publications/external/technical_reports/PNNL-23893.pdf. Retrieved from the internet on Apr. 4, 2022.

(Continued)

*Primary Examiner* — William A Corum, Jr.
(74) *Attorney, Agent, or Firm* — Kimberly Zillig

(57) ABSTRACT

A system and method for hardening security within a physical location. At least one cable in the physical location is monitored for errors. In response to detecting an error on the cable a cable fault analysis procedure is performed to determine the location of the fault on the cable. A probability that the fault is caused by a threat actor is calculated based upon the location of the fault on the cable. The probability can be calculated using mixture modules of known nonthreat locations using supervised learning approaches. At least one security protocol at the physical location is implemented in response to the location of the fault having a probability that the fault location is related to a threat actor exceeding a threshold value.

20 Claims, 5 Drawing Sheets

(56) References Cited

U.S. PATENT DOCUMENTS

| | | | |
|---|---|---|---|
| 10,326,796 | B1 | 6/2019 | Varadarajan |
| 10,362,057 | B1 | 7/2019 | Wu |
| 2010/0180350 | A1* | 7/2010 | Glaubert ............ H04L 41/0681 726/34 |
| 2012/0182023 | A1 | 7/2012 | Zhang |
| 2016/0085959 | A1* | 3/2016 | Trika .................... H04L 9/0894 726/7 |
| 2016/0100324 | A1 | 4/2016 | Henry |
| 2021/0243070 | A1 | 8/2021 | Kasperson |
| 2022/0345214 | A1* | 10/2022 | Tabet ...................... G06N 20/00 |

OTHER PUBLICATIONS

John McDermott, How are Fiber Optic Cables Used For (Physical) Intrusion Detection? https://blog.learningtree.com/fiber-optic-cables-used-physical-intrusion-detection/. Retrieved from the internet on Apr. 4, 2022.

Leveraging app relationships and distribution patterns to identify malicious software. Feb. 22, 2019. IPCOM000257598D. https://priorart.ip.com/IPCOM/000257598.

Maik Seewald. A Behavior-Based Method for Threat Detection and Prevention in Energy Automation Systems. Jun. 6, 2016. IPCOM000246409D. https://priorart.ip.com/IPCOM/000246409.

Method and System for Providing Dynamic Network Management using Self-Tuning Algorithm. Mar. 2, 2018. IPCOM000253079D. https://priorart.ip.com/IPCOM/000253079.

Mitigations and Hardening Guidance for MSPs and Small-and Mid-sized Businesses. Jul. 14, 2021. cisa.gov. https://www.cisa.gov/sites/default/files/publications/CISA%20Insights_Guidance-for-MSPs-and-Small-and-Mid-sized-Businesses_S508C.pdf. Retrieved from the internet on Sep. 28, 2021.

Pourarab, M.H., Alishahi, S., & Aghli, N. (2015). Electric Power Theft Detection Using Time Domain Reflectometer. http://cired.net/publications/cired2015/papers/CIRED2015_1480_final.pdf.

Protecting Sensitive and Personal Information from Ransomware-Caused Data Breach. rhttps://www.cisa.gov/sites/default/files/publications/CISA_Fact_Sheet-Protecting_Sensitive_and_Personal_Information_from_Ransomware-Caused_Data_Breaches-508C.pdf. Retrieved from the internet on Sep. 28, 2021.

Rumez, Marcel et al. "CAN Radar: Sensing Physical Devices in CAN Networks based on Time Domain Reflectometry." 2019 IEEE Vehicular Networking Conference (VNC) (2019): 1-8.

Securing the Grid with Cybersecurity Technologies—Pacific Northwest National Laboratory. https://www.pnnl.gov/sites/default/files/media/file/DDST0075_GridCyberSecurity_web%20%282%29.pdf. Retrieved from the internet on Sep. 28, 2021.

TDR 100 Sensor Point Cable Sensor System. https://www.advancedperimetersystems.com/tdr-sensor-point. Retrieved from the internet on Apr. 4, 2022.

* cited by examiner

DEVICE SECURITY FOR CABLE THREAT ACTORS

BACKGROUND

The present disclosure relates to device security, and more specifically, to hardening of a data center in response to an insider threat.

Data centers are physical locations that house any number of computer components such as servers. These servers are often running a number of programs which contain sensitive information that would be of interest to certain individuals and organizations that would otherwise not be entitled to access this information. The computer components transmit data to and from each other as well as the outside world through the use of cables. As the cables contain the sensitive information while it is being transmitted from point A to point B if the cable were cut at some location between the two components it becomes possible for this data to be intercepted. Alternatively, a bad actor may be motivated to cause havoc by disrupting power or signal cables and have no intention of stealing data. However, to prevent this type of action operators of data centers implement a number of security measures. These measures include background checks of personnel who enter the area where the machines are located, physical security (e.g., badge readers, locked cages, etc.), and video and audio monitoring. While these measures help with security, they are not foolproof and can be bypassed. Existing security measures also do not prevent insider threats from those that do have access to the data center.

SUMMARY

Embodiments of the present disclosure are directed to a process for hardening security within a physical location. The process monitors at least one cable in the physical location for errors. In response to detecting an error on the cable the process preforms a cable fault analysis procedure to determine the location of the fault on the cable. A probability that the fault is caused by a threat actor is calculated based upon the location of the fault on the cable. The probability can be calculated using mixture modules of known nonthreat locations using supervised learning approaches. The process then implements a security protocol at the physical location in response to the location of the fault having a probability that the fault location is related to a threat actor exceeding a threshold value.

Embodiments of the present disclosure are directed to a system for providing enhanced security at a physical location. The system includes a plurality of servers within the physical location and a plurality of cables connected to the plurality of servers. A cable fault detector is provided to detect a location of a fault on at least one cable of the plurality of cables. A cable fault analysis module is provided to determine the location of the fault on the cable. A supervised mixture module builds a mixture module for each cable type of the plurality of cables by clustering failures that were not caused by a threat, and a cable fault mixture module database stores a latest mixture module for each cable type, a threat actor security hardening module is provided to calculate a probability that the fault is caused by a threat actor based upon the location of the fault on the at least one cable and a corresponding mixture module for the cable type. The threat actor security hardening module then implements at least one security protocol in the physical location in response to the probability exceeding a threshold value.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
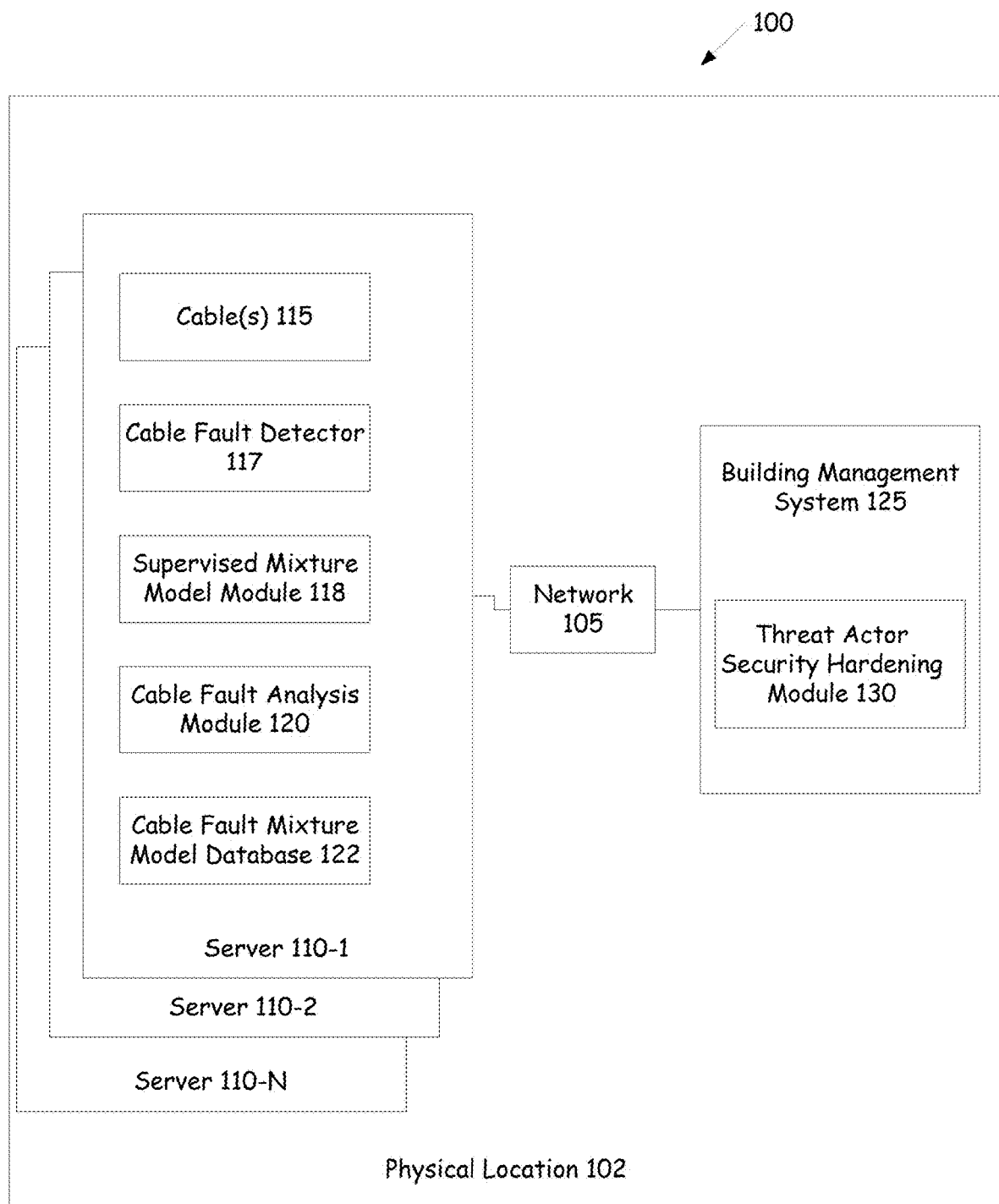
FIG. 1 is a block diagram of a system configured to provide hardening of a data center security according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to device security, more particular aspects relate to hardening of a data center in response to an insider threat. While the present disclosure is not necessarily limited to such applications, various aspects of the disclosure may be appreciated through a discussion of various examples using this context.

According to industry experts, the colocation data center market is growing at a 15.3% compound annual growth rate. In order to remain competitive, many companies have to use these shared colocations to scale compute power. This type of growth drives data center physical security upgrades. A modern data center should have multiple physical intrusion detection policies such as CCTV, alarms, card readers, etc. However, these security methods are not foolproof. Internal attacks in which users bypass these safeguards can also occur. If a threat actor is able to gain access to the data center, it is not uncommon for mainframe/server cabinets to be unlocked. Even if mainframe/server cabinets are locked, cables still run to and from the hardware where at least a portion of the cable is not behind locked doors. In some cases, an "insider" may have the credentials to access a location in the data center.

In the case of a threat actor gaining access to a rack, there should be extra safeguards in place to protect the physical hardware on the system. An attacker may be motivated to disrupt computer power or signal cables rather than steal data. Therefore, the attacker may seek to destroy/disable hardware responsible for data processing or system power. So, hardware in the rack can be defined as an exploitable vulnerability in the data center.

The present disclosure provides a method and system to harden data center security in response to a threat actor cutting a cable inside the data center. Again, cables are an exploitable vulnerability in the data center when the threat actor is able to bypass other data center security measures (i.e., an "insider"). When a malicious cable fault is detected, a reaction module enacts security measures for the affected system and, in some embodiments, other systems in the same physical location (e.g., data center). This will reduce potential damage caused by a threat actor if they intend to steal data or continue their malicious actions.

The reaction module can enact security measures related to data backup and encryption, distributing processing to a different location, shutting down the affected system, physical alerts, and/or protection in the data center (e.g., door locks in vicinity, alarms, and other indication).

FIG. 1 is a block diagram of a system 100 configured to provide hardening of a data center security in response to cable threat actors according to embodiments of the present disclosure. System 100 includes a physical location 102, a network 105, a number of servers 110-1, 110-2, 110-N (collectively server 110), a building management system 125, and a threat actor security hardening module 130.

System 100 in some embodiments exists within the bounds of a physical location 102 such as a data center. It should be noted that in some embodiments, the physical location 102 includes a data center as well as all the facilities inside and outside the building that houses the data center where communication and/or power cables interface with the systems. The physical location 102 includes one or more servers 110 and a building management system 125. These are interconnected via a network 105.

The network 105 can be any type of network such as a wired or wireless network.

Further network 105 can use multiple different types of networks. The wired and/or wireless networks in network 105 can be any communication protocol that allows data to be transferred between components of the system such as PCIe, ethernet, Bluetooth, Wi-Fi, Cellular (e.g., 3G, 4G, 5G), etc.

Server 110 is one or more computing systems that are housed within the location 102. The server 110 can be, for example, a mainframe (e.g., IBM Z systems), server (IBM Power Systems), or storage (e.g., IBM Storage) system. The server 110 includes one or more cables 115, a cable fault detector 117, a supervised mixture model module 118, a cable fault analysis module 120, and a cable fault mixture model database 122. However, in other embodiments these components can be located elsewhere within the physical location.

Cable 115 can include any cable that runs internal to server 110, connects between server 110 and another server 110 within the location 102, or can include any cable that connects the server 110 to a location outside of location 102. Further, cable 115 can include signal and/or power cables. It should be understood that while reference herein is made to a single cable, cable 115 represents any number of cables present in the system 100.

Cable fault detector 117 is a component of the system 100 that is configured to detect the location of a fault along the cable 115. The cable fault detector 117 can be either hardware or software that performs the detection. The cable fault detector 117 uses existing methods for detecting the location of a fault along the cable. For example, the cable fault detector can implement processes such as observing reflected waveforms as is done with a time-domain reflectometer (TDR), frequency-domain reflectometer (FDR), arc reflection, vector network analysis (VNA), scalar network analysis (SNA), optical time domain reflectometry (OTDR), magnetic field detection, etc. The cable fault detector 117 is further configured to send output data to cable fault analysis module 120 for analysis.

The supervised mixture model module 118 is a component of system 100 that is configured to take input data from a user after a cable fault occurs and build mixture models with artificial intelligence (AI) clustering on failures that were not caused by a threat actor. The supervised mixture model module 118 builds a mixture module for each type of cable and each length of cable. The input data can be provided from lab collected data (e.g., on a data center test floor) or can come from cables utilized in the field. In some embodiments, the mixture models are a Gaussian mixture model. However other types of models can be used. In some embodiments the mixture models are continuously updated with the latest versions stored on the cable fault mixture model database 122.

The cable fault analysis module 120 is configured to monitor cable 115 according to embodiments of the present disclosure. Specifically, the cable fault analysis module 120 is configured to detect the location of a fault along the cable and determine whether the fault is a cable fault or is due to a threat actor. The cable fault detection module 120 module takes input from the cable fault detector 117 and the cable fault mixture model database 122 and sends output data to the threat actor reaction module 130 of the building management system 125. The details of the process implemented by the cable fault analysis module 120 is described in further detail with reference to FIG. 4.

The cable fault mixture model database 122 is a component of the system 100 that contains the latest mixture models for each cable type that has been generated by the supervised mixture model module 118. In some embodiments, the supervised mixture models can be continuously updated as new data is added. The cable fault mixture model database 122 sends output data to the cable fault analysis module 120. In some embodiments, the supervised mixture model module 118 may be removed and the cable fault mixture model database 122 can be replaced with a cable fault database 122 which further includes information about all the monitored cables 115 within server 110 or system 100.

For instances where a cable fault database 122 is used in place of a cable fault mixture model database 122, the data that is collected or coalited for the system 100 related to the cables including cable length and high-risk distances (with mechanical tolerances) from each end (inside the connectors) that are common areas for cable faults to occur due to a reliability concern. Bulk wire between these high-risk areas is considered low risk for where a fault would indicate a high probability of a threat actor tampering with the cables. It is common for cables to enter inside the connectors on both ends. As such it would be next to impossible for a threat actor to cut a cable at these locations. Some cables include paddle cards inside the connectors which take up additional distance within the connector, and a fault at these locations would not likely be due to a threat actor cutting a cable. While possible, it is very uncommon for cables to fail along the length of the cable between the connectors.

Example database entries that can appear in a cable fault database 122 is illustrated below with respect to Table 1.

TABLE 1

| Part Number | Length (mm) | High-Risk Regions (mm) |
|---|---|---|
| SAAMPG6 | 1828.8 | 0-76.2, 1752.6-1828.8 |
| JAKS10 | 3048.0 | 0-50.8, 2997.2-3048 |

The building system management system 125 contains a threat actor security hardening module 130 that is configured to perform one or more actions to improve security on the specific server 110 and/or other servers within the physical location 102 in response to a cut cable, such as a cable cut by a threat actor. In some embodiments the threat actor security hardening module 130 is located on the server 110. The security hardening module 130 can be configured to implement various actions in response to a perceived threat actor tampering with one or more cables, such as, transitioning workload to another system at a different physical location (e.g., different fog node or different data center), enabling a door lock on all other systems and/or rooms within the physical location 102, enacting a data backup routine for the system that contains the malicious cable cut and/or other servers within the physical location 102, enacting enhanced data encryption on the system that contains the malicious cable cut and/or other servers within the physical location 102, shutting down the component/drawer/system where the malicious cable cut was detected, and/or sounding alarms within the physical location 102 and providing a location of the impacted server 110 and hence, the location of the threat actor. However, other or different, or combinations of security actions can be taken based on the probability that a threat actor is present. This enables the protection of not only data within the system that detected the threat, but other systems around that system. This is important because there is no way of knowing what that threat actor is doing or may continue to do. For example, the threat actor may insert a device between the cut cable to steal data, or the threat actor may continue to cut more cables in any system within the physical location 102.

Figure 2:
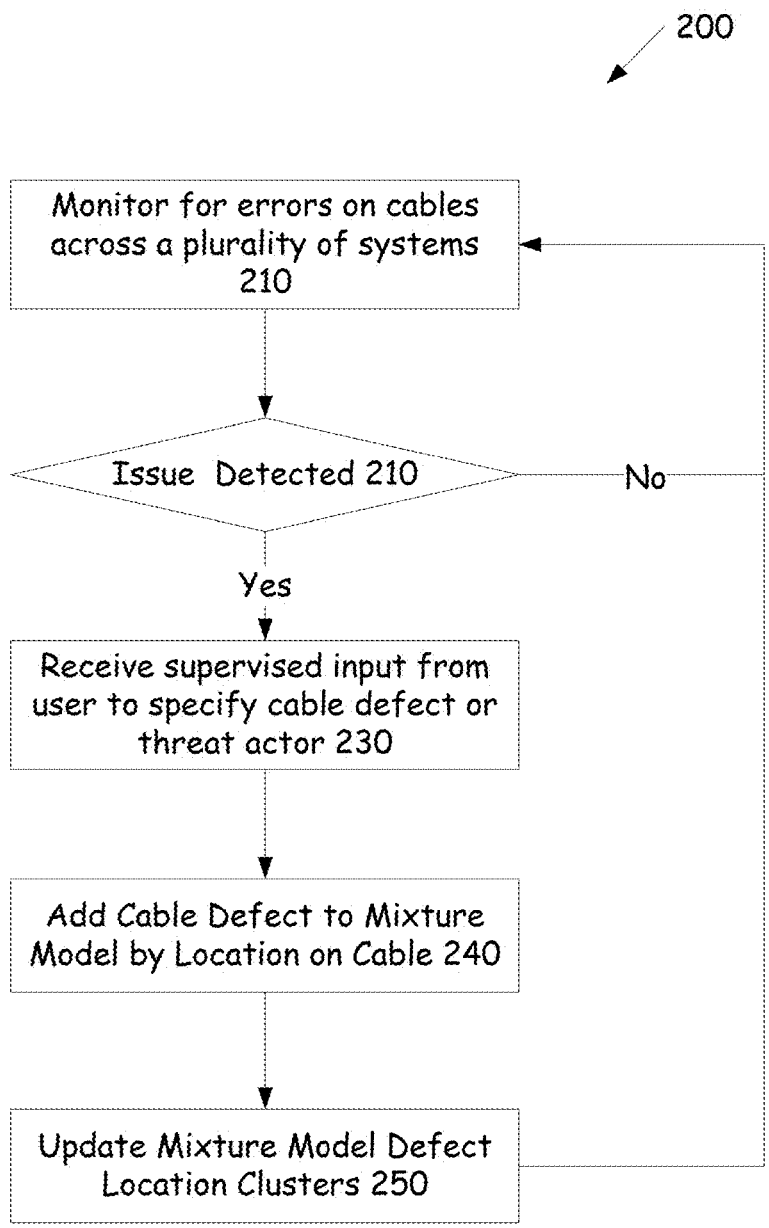
FIG. 2 is a flow diagram illustrating a process for building a mixture module for each cable type and length according to embodiments of the present disclosure.

FIG. 2 is a flow diagram illustrating a process 200 for building a mixture module for each cable type and length according to embodiments. In some embodiment process 200 can be executed by the supervised mixture model module 118. In some embodiments AI clustering on failures that were not caused by a threat actor are incorporated in the process for building the models.

The process begins by monitoring for errors on cables across a plurality of systems. This is illustrated at step 210. In some embodiment, the monitoring can be across a data center, test floor, or can be diagnostic data that can be extracted/received across all systems running in the field. Any approach for monitoring the cables can be used at this step (e.g., monitoring errors on the cable, detecting loss or power, detecting loss of signal, etc.). Further combination of monitoring approaches can be used.

The process then determines if an issue with a cable has occurred. This is illustrated at step 220. For example, the process can determine if a cable fault was detected. If a cable fault was not detected (block 220 "No" branch), the process loops back to block 210 to continue monitoring the cables for faults.

If a cable fault was detected (block 220 "Yes" branch), the process proceeds to receive supervised input from a user to specify whether the fault was due to a cable defect or a threat actor. This is illustrated at step 230. This input can be input at the time the event is detected or can be input a later time after the event has been resolved.

Once the input has been received from the user describing the event, the process proceeds to add the cable defect to the mixture module by the location on the cable. This is illustrated at step 240. It should be noted that only defects and faults that occurred normally are add to the mixture module. Those caused by an actual threat actor are not entered such that the mixture model only reflects actual cable faults. The location of the defect or fault is determined by the cable fault detector 117. The data is then added to the correct mixture module associated with the specific cable. (e.g., same type, length, PN, etc.). The process then proceeds to update the corresponding mixture models in the cable fault mixture model database. 122. This is illustrated at step 250.

Figure 3:
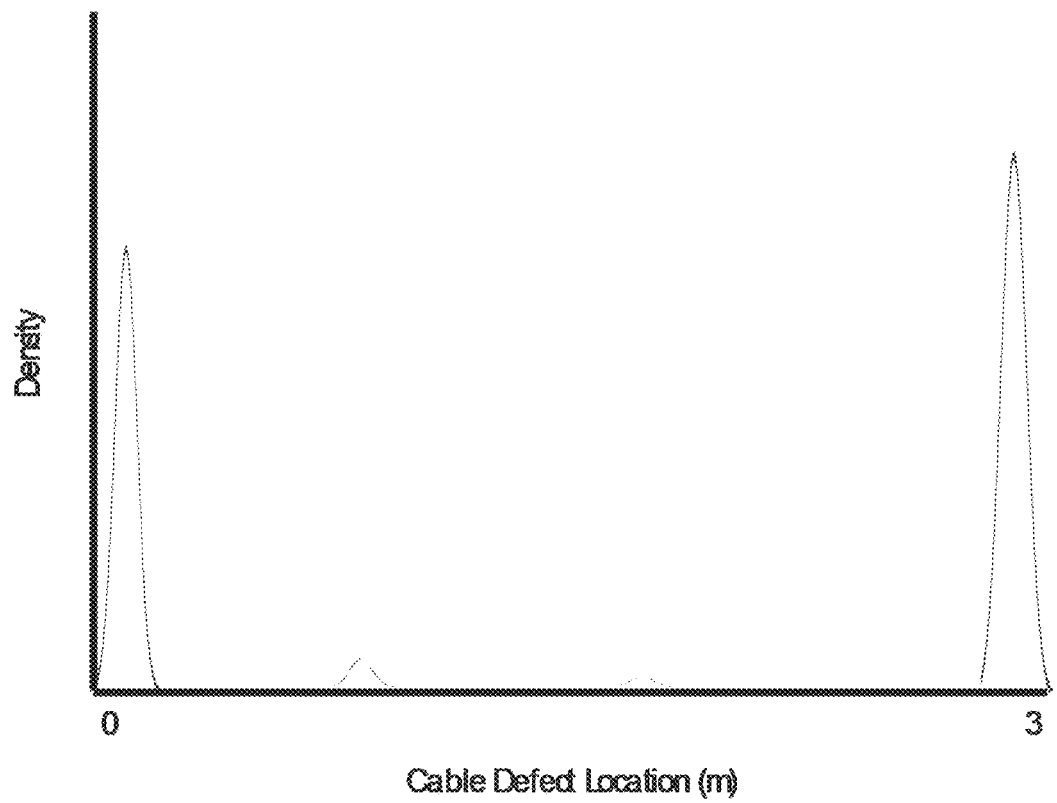
FIG. 3 is an example mixture model for a single 3 meter cable that can be stored in the cable fault mixture model database 122 according to embodiments of the present disclosure.

FIG. 3 is an example mixture model for a single 3-meter cable that can be stored in the cable fault mixture model database 122. The example of FIG. 3 illustrates a gaussian mixture model (GMM). However, other types of mixture models can be used. In this example there is a high-density clustering at the two ends of the cable. This signifies that most of cable defects are occurring within the connectors. This correlates with the fact that there is an increased risk of failure within cable 115 anywhere the cable is soldered, crimped, welded or mechanically attached to a connector, paddle card, PCBA, or spliced together. In some embodiments, a high-density peak may occur somewhere along the cable (not near the connectors) due to its integration within a product (e.g., cable is bent in a specific location within the product, cable commonly gets caught in a door, etc.).

Figure 4:
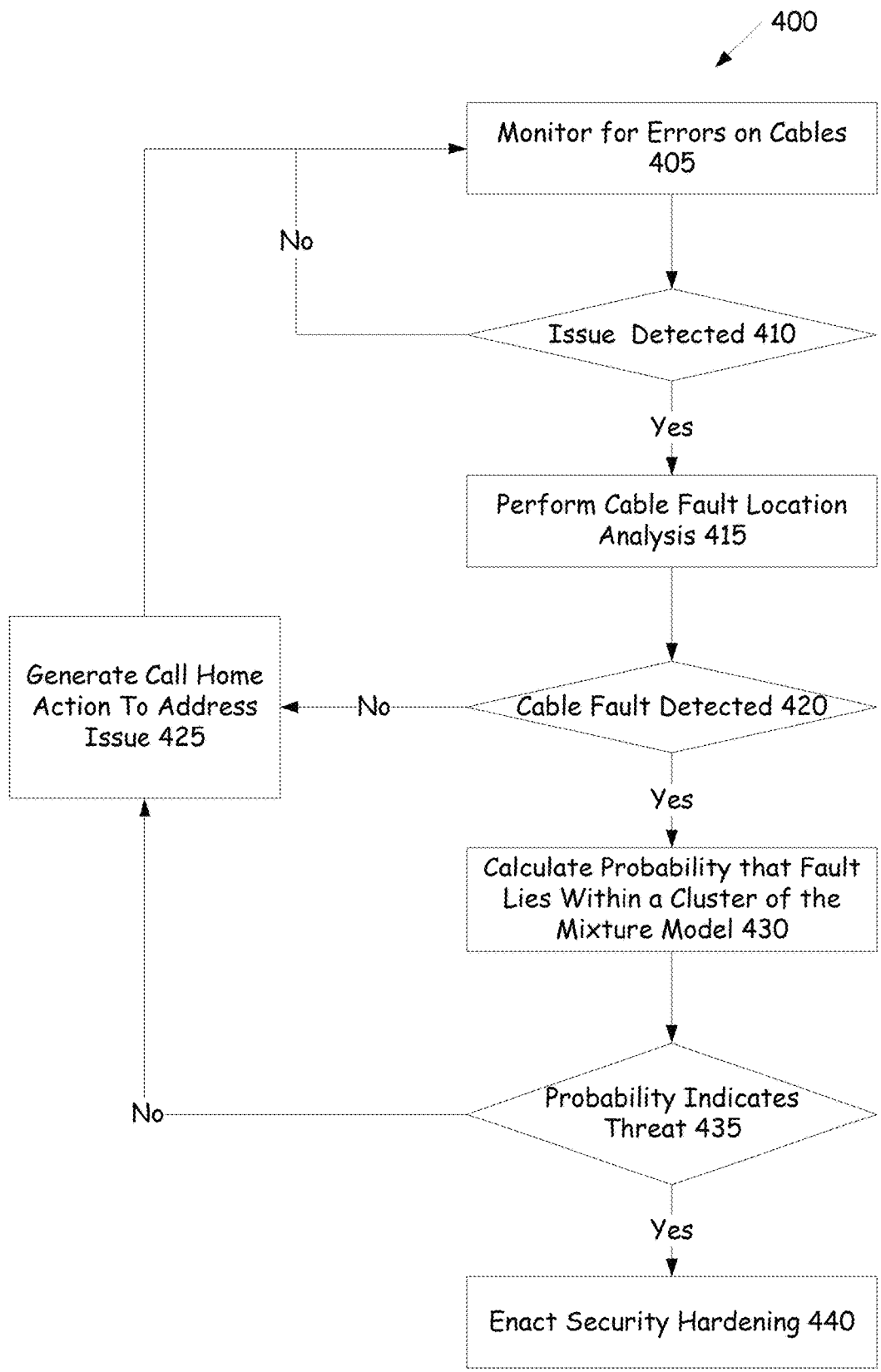
FIG. 4 is a flow diagram illustrating a process for detecting and reacting to a malicious cable threat according to embodiments of the present disclosure.

FIG. 4 is a flow diagram illustrating a process 400 for detecting and reacting to a malicious cable threat according to embodiments of the present disclosure. The process 400 uses the mixture model which is executed by cable fault analysis module 120 to determine whether a new fault is a due to a defect or a threat actor.

The process begins by monitoring the cables for errors. This is illustrated at step 405. The server 110 monitors the overall health and performance of cables within the system. Many different types of cable errors can be monitored for such as, bit error rate (BER), continuity, power consumption, correctable errors (CE's), loss of signal, or other similar software disruption warnings. At step 410 the process determines if an error was detected on one or more cables within the server 110. If no error is detected, the process continues to monitor the system.

However, if a cable fault or error is detected, the process proceeds to perform a cable fault location analysis. This is illustrated at step 415. At this step, an electrical test is performed within the system to determine more information on the failure including what the failure is and where along the cable the particular failure occurred. There are many different types of tests that can be performed to determine location of a failure such as, TDR, OTDR, VNA, and SNA test. In some embodiments, these tests can be built into either the cable and/or the server 110. For example, using the TDR test, this test analyzes the signal characteristics using reflected waveforms and is able to determine what the failure is; a hard fault (short/open) or intermittent (high resistance), as well as the position within the cable where the defect is located.

Following the cable fault location analysis, the process proceeds to determine if a cable fault was detected. This is illustrated at step 420. In some instances, there may be nothing physically wrong with a cable and the issue that was detected was due to other causes. For example, connector creep over time, debris or contamination within the connector pins/lens, etc.

If the process determines that the issue was due to a cable fault, the process proceeds to determine if the fault lies in a cluster location. This is illustrated at step 430. The process accesses the cable fault mixture model database 122 to extract the mixture model for the cable type where the fault was detected. It further calculates the probability that the current fault location lies within a high-density cluster. In some embodiments, the mixture model database 122 exists on server 110 where all internal cables lengths are known. In some embodiments, the database 122 exists within the building management system 125 where cable info for cables exiting the system are either determined using TDR, OTDR, VNA, SNA or are manually entered.

Next the system determines if the calculated probability exceeds a threshold. This is illustrated at step 435. The threshold value indicates whether or not the fault is indicative of a threat actor. For example, the threshold is a density threshold in the mixture model. Again, the probability is based on the location of the fault as against the high-density cluster areas.

If it is determined that the fault fell inside the high-density regions of the cable at step 435 or if it was determined that the issue was not due to a cable fault at step 420, the process generates a call home action to address the issue as it is not due to a threat actor cutting a cable. This is illustrated at step 425. A fault that falls into the high-risk region is likely not an indication of a threat actor because the areas are typically within the housing of the connector itself and cannot simply be cut. As such, it is more likely that the cable failed on its own due to a reliability issue.

If it is determined that the fault fell inside the low-risk regions of the cable, the process indicates that a potential threat actor has been detected. This is executed at step 440. The indication of the threat actor is passed through network 105 to the threat actor security hardening module 130 of the building management system 125. As the location of the cable fault is in a low-risk region, there is a high probability that the failure is due to the presence of a threat actor. As discussed above the threat actor security hardening module 130 can perform one or more of the following actions in response to the threat indication. Transitioning workload to another system at a different physical location (e.g., different fog node or different data center), enabling a door lock on all other systems and/or rooms within the physical location 102, enacting a data backup routine for the system that contains the malicious cable cut and/or other servers within physical location 102, enacting enhanced data encryption on the system that contains the malicious cable cut and/or other servers within physical location 102, shutting down the component/drawer/system where the malicious cable cut was detected, sounding alarms within the physical location 102 and providing a location of the impacted server 110 and hence, the location of the threat actor to an entity responsible for physical security of the location. In some embodiments, different security actions can be taken based on the probability that a threat actor is present. For example, if the failure falls within a low-density region of one of the clusters, security actions for just that system can be enacted but not for other neighboring systems within the data center.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
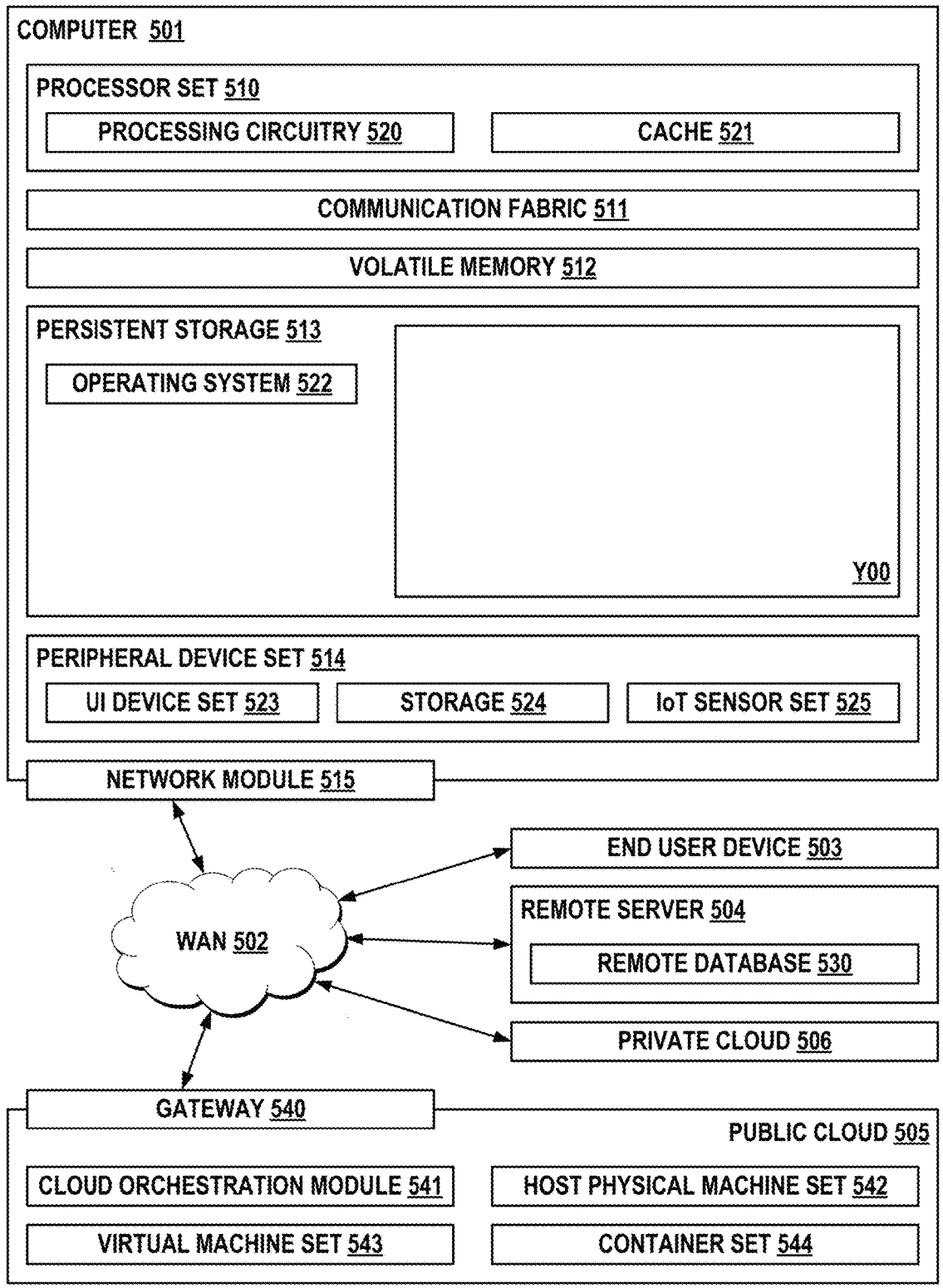
FIG. 5 is a diagrammatic illustration of a computing environment according to embodiments of the present disclosure.

FIG. 5 is a diagrammatic illustration of a computing environment 500. Computing environment 500 contains an example of an environment for the execution of at least some of the computer code involved in performing at least a portion of the present disclosure, such as detecting and reacting to malicious cable threat actions using the building management system 125. In addition to block 125, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 200, as identified above), peripheral device set 514 (including user interface (UI) device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

Computer 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

Processor set 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 521 and the other storage media discussed below. The program instructions, and associated data, are accessed by processor set 510 to control and direct performance of the disclosed methods. In computing environment 500, at least some of the instructions for performing the disclosed methods may be stored in block 200 in persistent storage 513.

Communications fabric 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

Persistent storage 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid state storage devices. Operating system 522 may take several forms, such as various known proprietary operating systems or open source Portable Operating System Interface-type operating systems that employ a kernel. The code included in block 200 typically includes at least some of the computer code involved in performing the disclosed methods.

Peripheral device set 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

Network module 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the disclosed methods can typically be downloaded to computer 501 from an external computer or external storage device through a network adapter card or network interface included in network module 515.

Wide area network (WAN) 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

Remote server 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

Public cloud 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for hardening security within a data center, the method comprising:
   monitoring a cable for errors;
   detecting an error within the cable;
   performing a cable fault analysis procedure to determine a location of a fault on the cable;
   determining whether the location of the fault is within a high-risk area of the cable located between two connectors located at two ends of the cable and not inside the two connectors;
   when the fault is within the high-risk area, calculating a probability that the fault is caused by a threat actor based upon the location of the fault on the cable being in the high-risk area; and
   implementing at least one security measure in the data center in response to the probability exceeding a threshold value.

2. The method of claim 1, wherein the calculating is performed using at least one Artificial Intelligence (AI) mixture module.

3. The method of claim 2, wherein the at least one AI mixture module includes a mixture model for each cable type monitored at the data center.

4. The method of claim 3, wherein the mixture model for each cable type monitored is built using supervised input from previous cable faults.

5. The method of claim 1, wherein the detected error is one selected from a group consisting of bit errors, correctable errors, a disconnected cable, a loss of signal, a loss of power, and an open circuit.

6. The method of claim 1, wherein the cable fault analysis procedure includes at least one selected from a group consisting of time domain reflectometer, arc reflection, and magnetic field detection.

7. The method of claim 1, wherein the implementing at least one security measure implements the at least one security measure in response to the fault falling below a threshold clustering density.

8. The method of claim 1, further comprising:
in response to the probability not exceeding the threshold value, generating an indication that the cable needs repair.

9. The method of claim 1, wherein the implementing at least one security measure comprises implementing one or more measures selected from the group of:
transitioning a workload to another system at a different data center;
enabling a door lock on all other systems within the different data center; and
enacting a data backup routine at the different data center.

10. The method of claim 1, wherein the implementing at least one security measure further comprises:
enacting an enhanced data encryption on a corresponding system associated with the fault.

11. The method of claim 1, wherein the implementing at least one security measure further comprises:
shutting down a corresponding system associated with the fault.

12. A computer readable storage medium having computer executable instructions that when executed by at least one computing device to harden security at a data center, comprising instructions to:
monitor a cable for errors;
detect an error within the cable;
perform a cable fault analysis procedure to determine a location of a fault on the cable;
determine whether the location of the fault is within a high-risk area of the cable located between two connectors located at two ends of the cable and not inside the two connectors;
when the fault is within the high-risk area, calculate a probability that the fault is caused by a threat actor based upon the location of the fault on the cable; and
implement at least one security measure in the data center in response to the probability exceeding a threshold value.

13. The computer readable storage medium of claim 12, wherein the calculate the probability of the fault is performed using at least one Artificial Intelligence (AI) mixture module.

14. The computer readable storage medium of claim 13, wherein the at least one AI mixture module includes a mixture model for each cable type monitored at the data center.

15. The computer readable storage medium of claim 14, wherein the mixture model for each cable type monitored is built using supervised input from previous cable faults.

16. The computer readable storage medium of claim 12, wherein the instructions to implement the at least one security measure implements the at least one security measure in response to the cable fault falling below a threshold clustering density.

17. The computer readable storage medium of claim 12, further comprising instructions to:
in response to the probability not exceeding the threshold value, generate an indication that the cable needs repair.

18. A system for providing enhanced security at a data center, the system comprising:
a plurality of servers within the data center;
a plurality of cables connected to the plurality of servers;
a cable fault detector configured to detect a location of a fault on at least one cable of the plurality of cables;
a supervised mixture module builder configured to build a mixture module for each cable type of the plurality of cables by clustering failures that were not caused by a threat;
a cable fault analysis module analyzer configured to detect the location of the fault on the at least one cable;
a cable fault mixture module database configured to store a latest mixture module for each cable type; and
a threat actor security hardening module hardener configured to:
receive an indication of cable the fault on the at least one cable from the cable fault detector;
receive a location of the cable fault from the cable fault analysis module analyzer;
determine whether the location of the fault is within a high-risk area of the at least one cable located between two connectors located at two ends of the at least one cable and not inside the two connectors;
when the fault is within the high-risk area, calculate a probability that the fault is caused by a threat actor based upon the location of the fault on the at least one cable and a corresponding mixture module for the cable type; and
implement at least one security measure in the data center in response to the probability exceeding a threshold value.

19. The system of claim 18, wherein the mixture module is generated using supervised learning.

20. The system of claim 18, wherein the threat actor security module hardener is further configured to:
in response to the probability not exceeding the threshold value, generate an indication that the at least one cable needs repair.

* * * * *